United States Patent [19]  
McKay et al.

[11] Patent Number: 4,790,270  
[45] Date of Patent: Dec. 13, 1988

[54] DIRECT FUEL INJECTED ENGINES

[75] Inventors: Michael L. McKay, Willetton; Steven R. Ahern, Claremont, both of Australia

[73] Assignee: Orbital Engine Company Proprietary Limited, Balcatta, Australia

[21] Appl. No.: 41,131

[22] PCT Filed: Jul. 18, 1986

[86] PCT No.: PCT/AU86/00202
§ 371 Date: Mar. 11, 1987
§ 102(e) Date: Mar. 11, 1987

[87] PCT Pub. No.: WO87/00575
PCT Pub. Date: Jan. 29, 1987

[30] Foreign Application Priority Data

Jul. 19, 1985 [AU] Australia ............... PH01559
Aug. 16, 1985 [AU] Australia ............... PH01991
Nov. 11, 1985 [AU] Australia ............... PH03344

[51] Int. Cl.4 ............................................. F02B 33/04
[52] U.S. Cl. ................................. 123/73 C; 123/305
[58] Field of Search ............ 123/299, 305, 276, 73 C

[56] References Cited

U.S. PATENT DOCUMENTS 1,903,381 4/1933 Kennedy ................. 123/305
2,164,234 6/1939 Erren ..................... 123/305
3,687,118 8/1972 Nomura .................. 123/73 CC
3,881,454 5/1975 Jaulmes .................. 123/73 PP
4,068,629 1/1978 Hooper ................... 123/73 C
4,579,093 4/1986 Eanes .................... 123/65 BA

FOREIGN PATENT DOCUMENTS 739397 3/1943 Fed. Rep. of Germany ...... 123/305
1337 3/1956 Fed. Rep. of Germany ...... 123/305
354076 9/1936 Italy ..................... 123/305
378239 11/1938 Italy ..................... 123/305
318964 8/1929 United Kingdom ............ 123/305
398435 9/1933 United Kingdom ............ 123/305
505332 5/1939 United Kingdom ............ 123/299

Primary Examiner—Charles J. Myhre
Assistant Examiner—David A. Okonsky
Attorney, Agent, or Firm—Armstrong, Nikaido, Marmelstein & Kubovcik

[57] ABSTRACT

In a two-stroke spark ignition engine, fuel is injected through the cylinder wall at a location opposite to and above the level of the exhaust port (120). The fuel is delivered in the form of a number of streams such as, for example, streams (60), (61), (62). One of the streams (60) is directed upwardly across the cylinder to deliver fuel towards the combustion chamber cavity (122). This stream (60) is arranged not to impinge on the spark plug (123) but is caused to create a fuel rich cloud within the cavity (122). Streams (62) are directed downwardly and outwardly from the injection location and an optional stream (61) may be directed across the cylinder towards the exhaust port side of the cylinder.

17 Claims, 7 Drawing Sheets

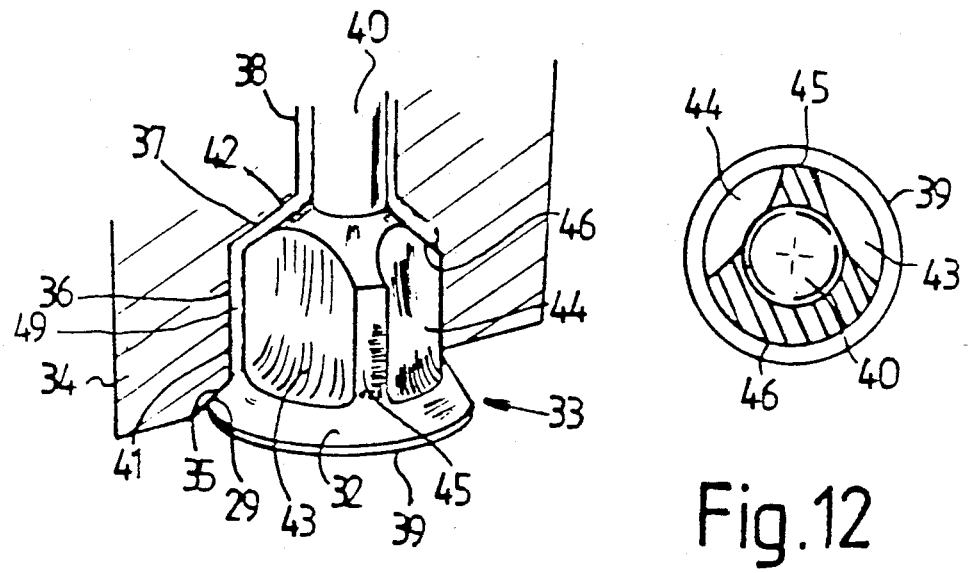
Fig. 11
Fig. 12
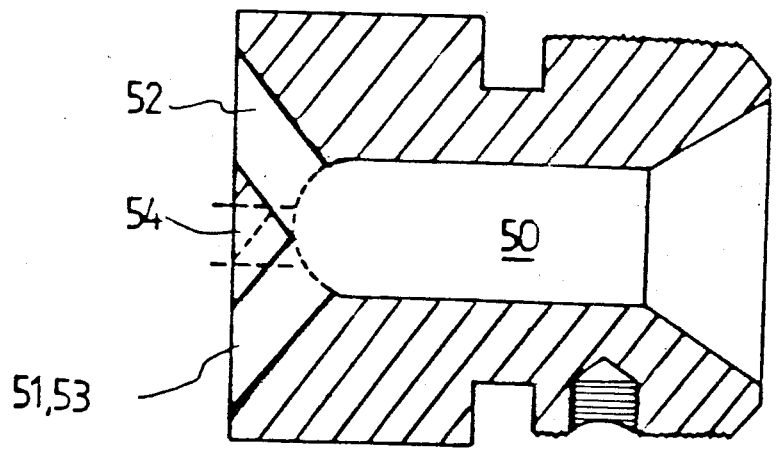
Fig. 9

DIRECT FUEL INJECTED ENGINES

This application relates to delivering fuel to an engine by injecting the fuel directly into the combustion chamber.

In order to maintain the exhaust emissions of an engine within the prescribed limit it is desirable to effectively distribute the fuel within the combustion chamber. One mode of reducing exhaust emissions is to ensure that the fuel is exposed to sufficient air to burn the fuel and so avoid release of unburnt hydrocarbons in the exhaust.

This problem is more pronounced in engines operating on the two stroke cycle because of the late timing of the closure of the exhaust port in the compression stroke. If the fuel is delivered a significant time before final closing of the exhaust port, some fresh fuel may escape to the exhaust, particularly at low engine speeds. However if injection is delayed until after the exhaust port is fully closed, there is limited time available to effect delivery and obtain effective dispersion of the fuel within the combustion chamber before ignition. This is of importance at high fuelling rates, and particularly at high engine speed which creates a further restraint.

Characteristics of the spray of the fuel droplets issuing from a nozzle into a combustion chamber also have a major effect on the efficiency of the burning of the fuel, which in turn affects the stability of the operation of the engine, the fuel efficiency and the exhaust emissions.

In order to optimise these features in a spark ignited engine the desirable characteristics of the spray pattern of the fuel issuing from a nozzle include small fuel droplet size, controlled penetration of the fuel spray into the combustion chamber and, at least at low engine loads, a relatively rich mixture in the vicinity of the spark plug. More specifically in the control of the harmful components of the engine exhaust, it is desirable to control the placement of the fuel within the gas charge in the combustion chamber to meet a number of different parameters. Ideally the fuel should be distributed in the gas charge so that the resultant fuel-air mixture is readily ignitable at the spark plug, all the fuel has access to sufficient air to burn completely, and the flame is at a sufficient temperature to extend to all the fuel before being extinguished. There are other factors that must also be considered, such as combustion temperatures that may promote detonation, or the formation of undesirable contaminants in the exhaust gas.

It is therefore the principle object of the present invention to provide a method and apparatus for delivering fuel to an internal combustion engine that will assist in achieving the required level of fuel economy and exhaust emissions.

With this object in view there is provided a method of feulling a two stroke cycle spark ignited engine having a cylinder in which a combustable charge is prepared, and a cylinder head closing one end of said cylinder and having a cavity therein communicating with the cylinder, an ignition means to ignite the combustable charge in said cavity, a piston supported to reciprocate in said cylinder, and an exhaust port in said cylinder spaced from said cylinder head, said method comprising injecting a metered quantity of fuel into the cylinder at a location between the level of the exhaust port and the cylinder head and in a manner to direct part of the fuel in a direction to enter the cavity in the cylinder head and to direct another part of the fuel into that part of the cylinder on the opposite side of a diametral plane of the cylinder at the location of injection of the fuel to the cylinder.

Conveniently the fuel is divided into a number of streams extending into the cylinder, one said stream delivering fuel towards the cylinder head, to enter the cavity and at least one said stream being directed downwardly and across the cylinder.

The injection of the fuel may be effected through the side wall of the cylinder through an injector nozzle at a location which will result in the nozzle being covered by the piston during a portion of the engine cycle.

The nozzle may be of a form which will deliver the fuel into the cylinder as a curtain of generally conical form which may be unbroken or divided into a number of segments. Alternatively the nozzle may have a plurality of orifices with an individual stream of fuel issuing from each orifice. In this latter form each stream is preferably in a conical form. The conical curtain of fuel in the continuous or broken form or the plurality of streams, are preferably all based on a fuel distribution of conical form having an included angle of $120° \pm 30°$.

A conventional two stroke cycle engine normally has two or more transfer ports spaced circumferentially in the cylinder wall and through which air is admitted to the cylinder. The injection of the fuel may be effected at a location directly above the transfer port if there is only one, or in a multi-transfer port cylinder, directly above the principal transfer port, which is usually located centrally with respect to the other transfer ports in the circumferential direction.

Preferably a plurality of streams of fuel are directed across the cylinder, and diverging with respect to the axial plane of the cylinder containing the upwardly directed stream. In a multi-transfer port cylinder the diverging streams are arranged to feed fuel into the air entering the cylinder through the respective side transfer ports. The diverging streams may be also downwardly directed with respect to the diametral plane of the cylinder at the level of the injector.

The directing of fuel to enter the cavity in the head establishes a relatively rich fuel-air mixture in the vicinity of the spark plug to ensure ready ignition of the cylinder charge. The fuel directed across the cylinder exposes that part of the fuel to the fresh air charge entering the cylinder from the transfer ports and hence to the maximum quantity of air so to aid the effective mixing thereof for complete combustion of the fuel.

Also the downward directing of some of the fuel exposes it to the high temperature top surface of the piston to reduce the quenching effect of the incoming fuel on the air charge.

The directing of the fuel into the various streams may be achieved by providing respective orifices in a nozzle, each orientated in the respective direction to provide fuel streams in the required stream directions. The size of the respective orifices may be selected so that the quantity of fuel in each stream may differ to also contribute to achieving the required fuel distribution within the combustion chamber.

The fuel may be injected as fuel alone, but is preferably entrained in a gas such as air or other combustion supporting gas. The entraining of the fuel in a gas assists in atomising the fuel as it is delivered through the injection nozzle.

The degree of penetration of the fuel streams into the combustion chamber may be controlled by regulating the pressure of the fuel supplied to the nozzle. An increase in the fuel supply pressure may be used to increase the extent of penetration of the fuel from the nozzle into the combustion chamber. The change in the pressure of the fuel supply may be in response to a change in engine speed. Conveniently, the pressure of the fuel supply is increased by a set amount upon the engine reaching a selected engine speed.

In one arrangement the distribution pattern of fuel from the injection nozzle is similar for all fueling rates. In other embodiments, the distribution pattern of fuel is varied substantially, in accordance with differing engine speed and load conditions.

When injection is effected through the cylinder wall as currently proposed rather than through the cylinder head as is conventional, it will be appreciated that the injection must be completed before the injector nozzle is covered as the piston rises in the cylinder during the compression stroke.

It is therefore preferred that the injector nozzle be located above the level of the upper edge of the exhaust port, this edge determining th timing of the exhaust port closure in the engine cycle. It is to be noted that normally in a two stroke engine the transfer ports are positioned to close about the same time, and preferably not later, in the engine cycle than the exhaust port closure.

Also it has been found desirable to vary the timing of the injection period in relation to exhaust port closure.

As previously referred to, many two stroke cycle engines have two or more transfer ports spaced circumferentially in the cylinder wall, and this arrangement assists in obtaining distribution of the fresh charge in the cylinder, and in scavenging of the exhaust gases from all areas of the cylinder. The transfer port arrangement may vary from a single port, generally diametrically opposite the exhaust port, to a plurality of ports, generally located in the 180° of arc of the cylinder wall opposite the exhaust port. In order to promote scavenging, the transfer ports are shaped to provide in the incoming air a velocity component in the direction towards the cylinder head.

Thus if the injection nozzle is located in the cylinder head, the incoming air and the injected fuel are moving in generally opposite directions. The distribution of the fuel in the cylinder is thus inhibited, and in particular the flow of fuel towards the transfer ports is inhibited due to the contra-flow of the incoming air so a low fuel density will exist immediately adjacent the transfer ports. Naturally the area of the cylinder adjacent the transfer ports is an oxidant rich area, and thus if not adequately fuelled this oxidant is not fully utilised.

Having regard to the above referred to considerations, the preferred location of the injection of the fuel is in the cylinder wall above the transfer port or ports, and between the level of the exhaust port and the cylinder head. This results in a major part of the delivered fuel being directed into the path or paths of the air entering the cylinder through the transfer ports.

With this arrangement of the fuel and air entering from the same side of the cylinder, at high engine speed operation the fuel is effectively transferred across the chamber in the short time available, while also achieving distribution of the mixture throughout the combustion space in the cylinder. This arrangement thus tends to result in a homogeneous charge in the combustion space, which is desirable for high speed and load performance.

In addition, the stream of fuel directed into the cylinder head cavity provides the advantage of a somewhat stratified fuel charge in the area of combustion initiation, which provides improved part load engine performance without substantial detrimental effects on the high speed/load performance.

Testing has shown that the spray pattern from the injector nozzle should be such that between approximately 30 and 60 percent of the mass of fuel injected should be directed above the diametral plane of the cylinder that passes through the axis of the injector nozzle, the balance being directed below said plane. The actual distribution of the fuel will vary with different engines and the operational requirements. A balance is selected on the basis that at low fueling rates a high proportion of the fuel should be directed upwardly and at high fueling rates a high proportion should be directed downwardly. In engines which operate mainly in the high load range, such as outboard marine engines, the distribution is preferably one third of the fuel upwardly toward the cylinder and two thirds downwardly. More generally between 33 to 50 percent of the fuel should be delivered above said diametral plane. The fuel may issue from the nozzle in the form of three streams angularly spaced equally about the axis of the nozzle with only one stream directed above the nozzle axis. Each stream may issue in a generally conical form which may have an included angle of about 30°.

It will be appreciated that different distributions of the fuel may be obtained with different angular relationships between the respective streams, and the different cone angle of the stream. Normally however, one stream is directed above the axis of the nozzle and the other two streams are directed below the axis at an angular spacing to provide the required proportion of fuel above and below the cylinder's diametral plane through the nozzle axis. The angular spacing between the two downwardly directed sprays at the nozzle may conveniently vary between 90° and 150°.

One embodiment of the nozzle also includes a further stream issuing axially from the nozzle and of a size so approximately 5 percent of the total fuel quantity issues therefrom.

The above discussed disribution into three fuel streams is conveniently achieved by providing a valve regulated orifice to control the timing of the fuel delivery in the engine cycle and the duration of delivery, and a nozzle plate downstream of the orifice. The nozzle plate has a series of apertures therein to divide the fuel mass into three streams directed as above described. Alternatively it is possible to control the fuel flow by particular configurations of a poppet valve, and both these constructions will be described in further detail later in this specification.

In these constructions there may be varying degrees of wall attachment effects as the fuel issues into the cylinder. The wall attachment effect is the characteristic of a fluid flowing over a surface to tend to follow the contour of that surface rather than separate therefrom at relatively abrupt changes in the direction of the surface.

Advantage of the wall attachment effect at the injector nozzle can be taken to direct part of the fuel flowing through the nozzle to flow along the surface surrounding the nozzle orifice or orifices. In a construction where the injector nozzle is located in the wall of an engine cylinder, use may be made of the wall attachment effect to cause some of the fuel delivered through the nozzle to flow in a direction along or generally parallel to the cylinder wall, generally in a direction normal to the nozzle axis. This flow has been shown to be particularly advantageous in mixture preparation in the engine when operating in high speed/load conditions, as it is desirable under such conditions to deliver fuel to the incoming air charge close to the transfer ports.

In order to further describe the fuel spray distribution reference will be made to the accompanying drawings illustrating particular practical arrangements of the injector nozzle and resulting spray patterns.

In the drawings:

FIGS. 9 and 10 show a further form of nozzle which may be used to obtain the desired fuel distribution in the combustion chamber.

FIG. 11 is a view partly in section of a poppet type valve and co-operating seat suitable as an injector nozzle for use in the injector unit shown in FIG. 7.

FIG. 12 is a cross-sectional view through the head of the valve in FIG. 11.

Figure 1:
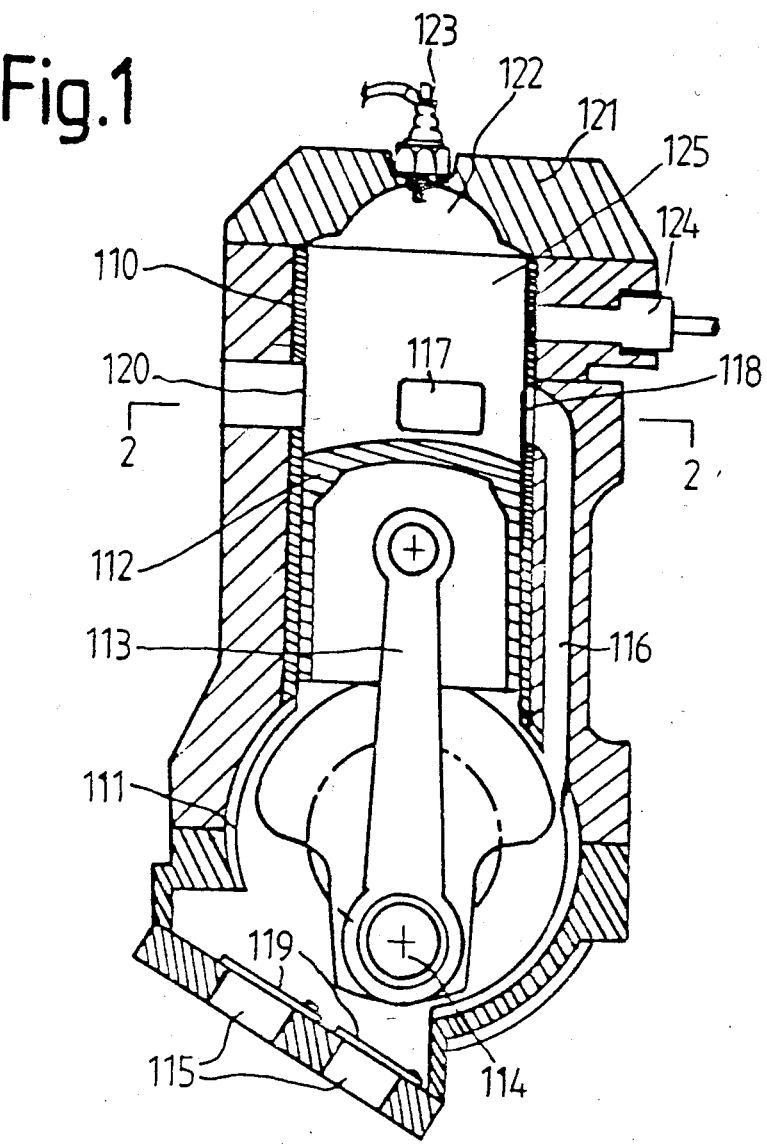
FIG. 1 is sectional view of a single cylinder and piston of a two stroke cycle reciprocating engine employing crankcase compression to charge the cylinder.
Figure 2:
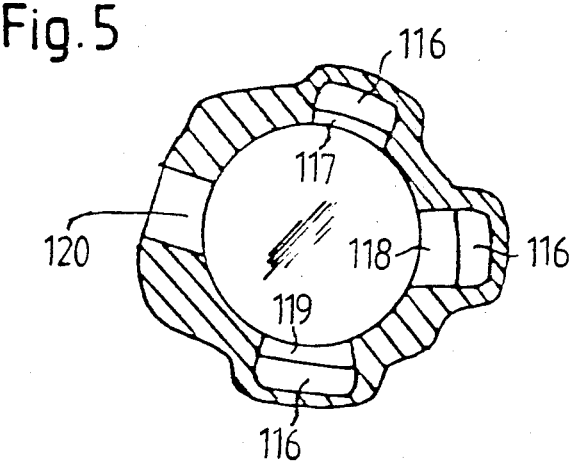
FIG. 2 is a diametral section of the engine in FIG. 1 along the plane 2—2.

Referring now to FIGS. 1 and 2, the engine overall is of generally conventional construction. The combustion chamber 125 is defined by cylinder 110, cylinder head 121 and piston 112 is coupled by the connecting rod 113 to the crankshaft 114 in crankcase 111. The crankcase incorporates air induction ports 115 provided with conventional reed valves 119, and three transfer passages 116 that communicate the crankcase 111 with respective transfer ports, a central transfer port 118 and two flanking transfer ports 117 and 119.

The transfer ports are each formed in the wall of the cylinder 110 normally with their respective upper edge located in the same diametral plane of the cylinder. An exhaust port 120 is formed in the wall of the cylinder generally opposite the central transfer port 118. The upper edge of the exhaust port may be slightly above the diametral plane of the transfer ports' upper edges, as shown in FIG. 1.

The cylinder head 121 has a central combustion cavity 122 into which the spark plug 123 extends. The fuel injector nozzle 124 is located in the cylinder wall directly above the central transfer port 118. The nozzle 124 is in this example located above the upper edge of the transfer port such that its axis is between half and three-quarters of the distance from said edge to the top of the cylinder. Generally the nozzle is located so that it is not completely covered by the piston until the piston is in a position corresponding to a crankshaft position between 60° and 70° before the top dead centre position of the piston. It will be appreciated that the nozzle will be uncovered at a corresponding position of the piston and crankshaft after top dead centre. Also there will be a period during which the nozzle progressively covered and uncovered by the piston. Typically, this period may be equivalent to approximately 10° of rotation of the crankshaft.

It has been found that the timing of injection of the fuel injection relative to the closure of the exhaust port 120 is a relevant factor in obtaining the required degree of mixing of the fuel with the incoming air, and avoiding undue loss of fuel through the exhaust port. Effective mixing of the fuel with the air and limiting of fuel lost through the exhaust port improves fuel economy and reduces hydrocarbon emissions.

In this regard, it is desirable to control the injection timing so that the mid-point of the injection period is substantially a uniform time interval before exhaust port closing. It is believed that the desirability of this time interval is related to the velocity of the incoming air charge and the diameter of the cylinder, the latter relating to the distance from the transfer port to the exhaust port. Tests on a two cylinder outboard marine engine having cylinder bores of 80 mm, have indicated that the time interval from injection mid-point to exhaust port closure should be approximately 3 ms over the normal operating speed range of 2,000 to 5,000 R.P.M. At the lower end of the speed range, this is desirably decreased, as for example to approximately 2 ms at 1,000 R.P.M.

Typical injection timings for the engine used in the above referred to tests, having exhaust port closure at 262.5° after top dead centre, are as following: (All timings are in degrees after top dead centre).

| Engine Speed R.P.M. | Start | Injection Finish | Mid Point |
| --- | --- | --- | --- |
| 1,200 | 245 | 274 | 259.5 |
| 2,000 | 214 | 258 | 236 |
| 3,000 | 232 | 298 | 265 |
| 4,000 | 192 | 266 | 229 |
| 5,000 | 114 | 224 | 169 |
| 5,500 | 95 | 207 | 151 |

Figure 3:
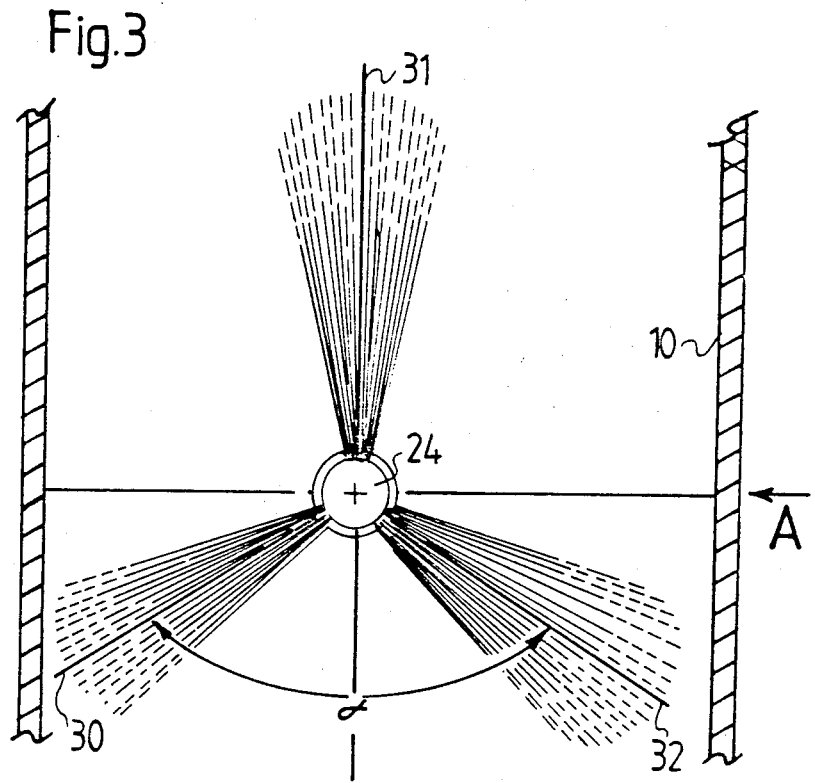
FIG. 3 is a diagrammatic representation of a fuel spray pattern viewed in the direction of the injection nozzle axis.
Figure 4:
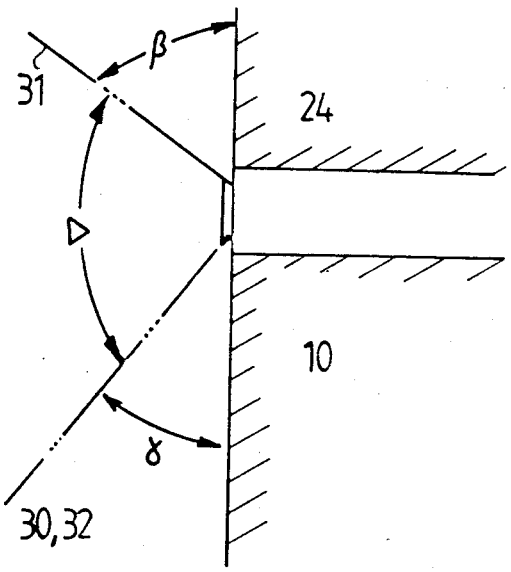
FIG. 4 is a diagram similar to FIG. 3 of the fuel spray viewed in direction A shown in FIG. 3.

Referring now to FIGS. 3 and 4 there is shown a typical distribution of the fuel sprays about the axis of the nozzle and in respect to the cylinder wall respectively. The nozzle 124 is arranged to give three main streams of fuel the centrelines of which are designated 30, 31 and 32. The stream 31 is directed upwardly to deliver fuel into the cylinder head cavity 122 and consequently the direction of said stream is principally determined by the relative positions of the cavity 122 and the spark plug 123 to the injection nozzle 124. The cavity 122 has its central plane coincident with the axial plane of the cylinder passing through the centre of the exhaust port 120 and the central transfer port 118. The axis of the nozzle 124 is also located in the aforesaid plane. the two downwardly directed streams 30 and 32 are symetrical with respect to the above referred to axial plane and the centreline or axis of each spray is preferably located within a cone having an included angle between 90° and 150° and extending from the tip of the nozzle.

The cone need not be coaxial with the axis of the nozzle, and may be inclined thereto in said axial plane. The angles B and γ shown in FIG. 4 may each vary from 15° to 60° the choice of such angles being dependent upon the particular engine fuelled. The angles referred to above are as projected onto the planes as represented in the drawings.

Figure 5:
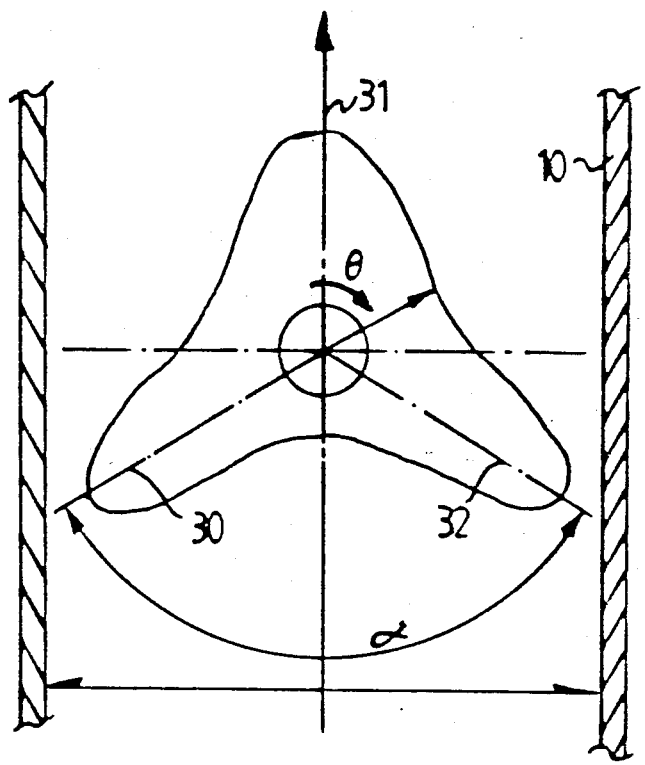
FIGS. 5 and 6 are polar diagrams of the fuel mass flux in the cylinder resolved into the directions corresponding to FIGS. 3 and 4 respectively.
Figure 6:
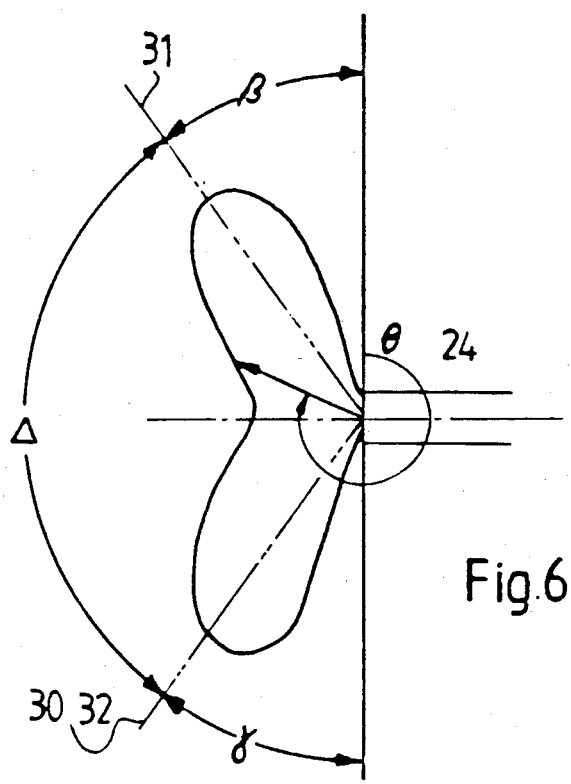

FIGS. 5 and 6 are polar diagrams of the fuel mass distribution in the cylinder with the three fuel streams arranged as shown in FIGS. 3 and 4. The polar diagrams represent the fuel distribution resolved into the two planes which are represented by FIGS. 3 and 4. The length of the vector from the centre of the nozzle to the plot in any direction represents the fuel density in the cylinder in that direction.

Figure 7:
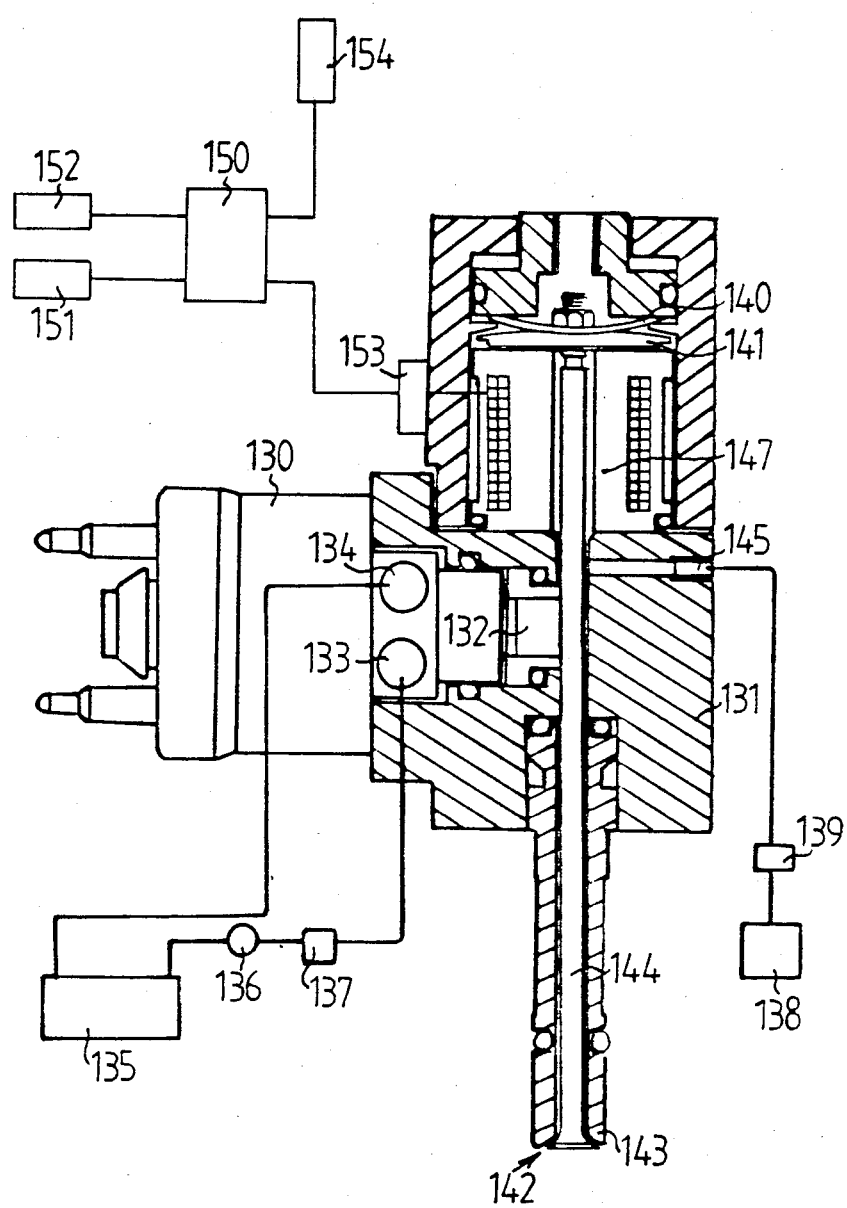
FIG. 7 is a side view partly in section of a fuel metering and injection unit, suitable for use with the engine shown in FIGS. 1 and 2, and showing diagrammatically attached ancillary equipment.

The injector nozzle 124 indicated in FIG. 1 is an integral part of a fuel metering and injection system preferably of the type wherein fuel entrained in air is delivered to the combustion chamber of the engine by the pressure of the air supply. One particular form of fuel metering and injection unit is illustrated in FIG. 7 of the drawings.

The fuel metering and injection unit incorporates a suitably available metering device 130, such as an automotive type throttle body injector, coupled to an injector body 131 having a holding chamber 132 therein. Fuel is drawn from the fuel reservoir 135 delivered by the fuel pump 136 via the pressure regulator 137 through fuel inlet port 133 to the metering device 130. The metering device operating in a known manner meters an amount of fuel into the holding chamber 132 in accordance with the engine fuel demand. Excess fuel supplied to the metering device is returned to the fuel reservoir 135 via the fuel return port 134. The particular construction of the fuel metering device 130 is not critical to the present invention and any suitable device may be used.

In operation, the holding chamber 132 is pressurised by air supplied from the air source 138 via pressure regular 139 through air inlet port 145 in the body 131. Injection valve 143 is actuated to permit the pressurised air to discharge the metered amount of fuel through injector nozzle 142 into a combustion chamber of the engine. Injection valve 143 is of the poppet valve construction opening inwardly to the combustion chamber, that is, outwardly from the holding chamber.

The injection valve 143 is coupled, via a valve stem 144, which passes through the holding chamber 132, to the armature 141 of solenoid 147 located within the injector body 131. The valve 143 is biased to the closed position by the disc spring 140, and is opened by energising the solenoid 147. Energising of the solenoid 147 is controlled in timed relation to the engine cycle to effect delivery of the fuel from the holding chamber 132 to the engine combustion chamber.

Further details of the operation of the fuel injection system incorporating a holding chamber is disclosed in Australian Patent Application No. 32123/84 and corresponding U.S. patent application No. 740,067 filed 2nd Apr. 1985, the disclosures of which are incorporated herein by reference.

The energising of the solenoid 147 is timed in relation to the engine cycle by a suitable electronic processor 150. The processor receives an input signal from the speed sensor 151 which signal is indicative of the engine speed and also identifies a reference point in the engine cycle in respective or which operations may be timed in relation to the engine cycle. The processor 150 also receives a signal from the load sensor 152 which signal is indicative of the air flow rate to the engine air induction system. The processor is programmed to determine from the air flow rate signal the load demand on the engine.

The processor 150 is further programmed to determine from the speed and load conditions of the engine the required timing of the injection of the fuel into the combustion chamber.

Conveniently the processor incorporates a multipoint map designating the required injection timing for a range of engine loads and speeds, these having been determined from tests carried out to obtain required engine power and exhaust emisssion levels. The processor is similarly programmed to determine from a multipoint map the required ignition timing of the engine in relation to engine load and speed as previously discussed.

The processor provides appropriate signals to the injector actuator 153 and ignition actuator 154, in accordance with the determinations, to energise the solenoid 147 at the required time for fuel ignition, and activate the spark plug 123 at the required time for ignition. The general construction of the load and speed sensors suitable for use as above indicated are well known in the industry, as are processors for performing the functions required by the processor 150.

Figure 10:
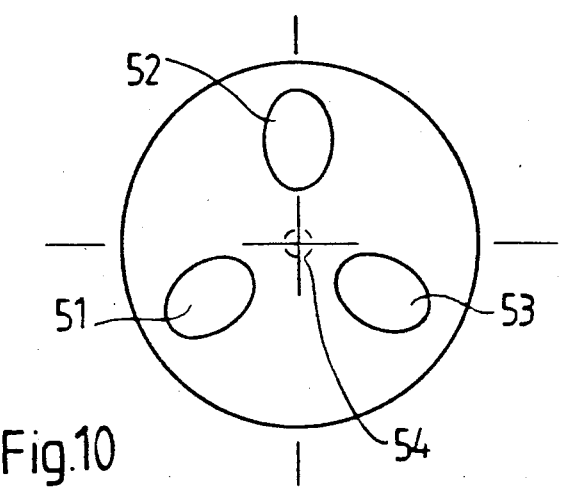

FIG. 9 is a sectional view and FIG. 10 a front end view of a form of nozzle plate for use in the engine cylinder wall to obtain the desired fuel distribution in the cylinder. This nozzle is used in conjunction with the conventional poppet valve as shown in FIG. 7, which times and regulates a supply of fuel to the nozzle. The nozzle plate is fitted to the end of the injector body 131 to enclose the valve 143. Fuel is supplied to the central bore 50 from the valve 43, and issues from the nozzle through the three orifices 51, 52 and 53 of equal diameter. The orifices are equally spaced angularly about the axis of the bore 50, although, the axis of the orifice 52 is inclined at 50° to the axis of the bore, whereas the axes of the orifices 51 and 53 are inclined at 45° thereto. In a modified form the nozzle may include an axial orifice 54 as shown in broken outline. This axial orifice is considerably smaller in diameter than orifices 51, 52 and 53 so that approximately 5 percent of the total fuel issues therefrom.

Figure 8:
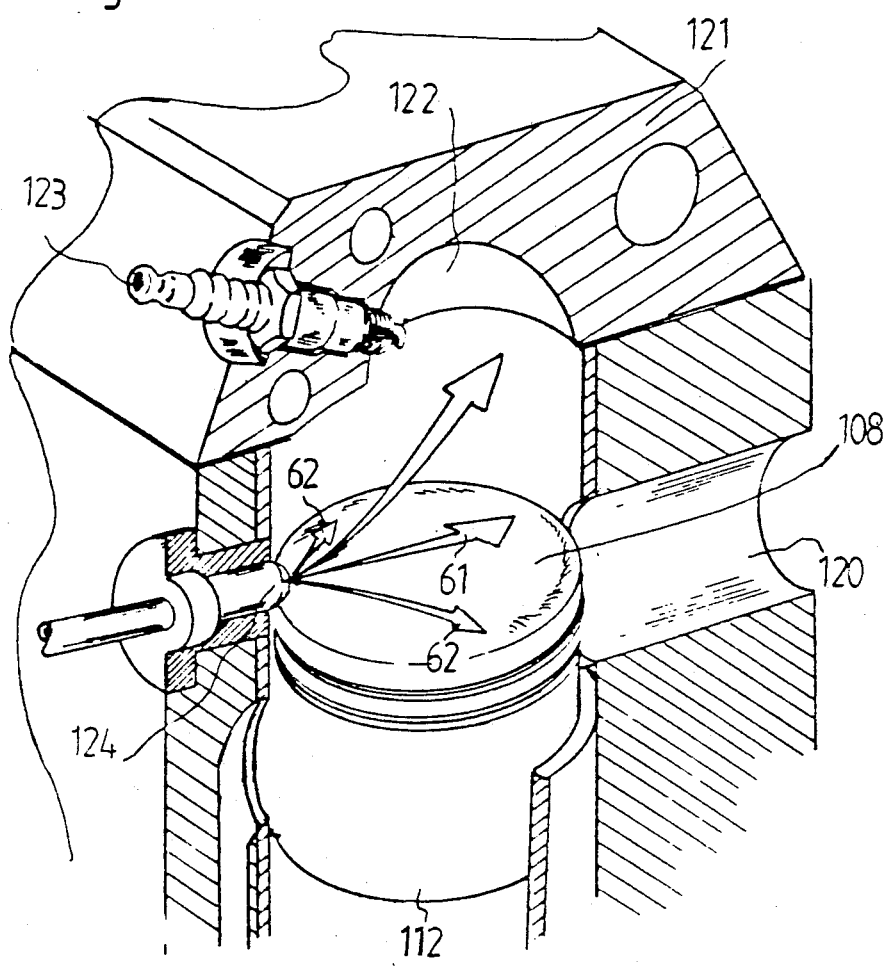
FIG. 8 is a diagrammatic part-sectional view of the combustion chamber area of an engine similar to that of FIGS. 1 and 2 and incorporating the nozzle shown in FIGS. 9 and 10.

The nozzle shown in FIGS. 9 and 10, and described above as the modified form with orifice 54 may be used to provide a fuel distribution in an engine combustion chamber as shown in FIG. 8. The position of the nozzle 124 is selected so that, with the particular patterns of fuel streams that are created by the arrangement of orifices in the nozzle, the streams will not impinge strongly on the various surfaces of the combustion chamber and create undue wetting of these surfaces with fuel. Another factor influencing the position of the nozzle 124 is that adequate time must be provided to complete injection of the fuel before the piston moves to close to the lower of the streams of fuel issuing from the nozzle. Preferably the nozzle should be located so that the piston will not interfere with the fuel streams prior to the last 90° of crank movement on the piston compression stroke.

As seen in FIG. 8, the stream 60 of fuel from the nozzle 124 is directed upward across the cylinder to deliver fuel towards the cavity 122. The stream 60 is arranged not to impinge on the spark plug 123 as this would tend to create undue deposits thereon. However, the stream 60 will create a fuel rich cloud within the cavity 122 that will be readily ignitable by the spark plug.

The fuel stream 61 is directed across the cylinder toward the exhaust port side of the cylinder. The two fuel streams 62 diverge to either side of the stream 61 to provide fuel to the respective side areas of the cylinder. These streams 62 are also directed downwardly below the diametral plane of the stream 61 towards the crown 108 of the piston 112. The streams 62 provide fuel to the air entering through the side transfer ports in a multi-transfer port engine, and provide fuel to the oxidant-rich transfer region as the piston moves upwardly so taking charge toward the top of the cylinder due to turbulence effects created by piston movement.

FIGS. 11 and 12 are views of a suitable alternative construction of poppet valve 143 and co-operating seat of the nozzle 142 therefor, for incorporation in the injector body 131 previously described. This alternative produces a spray pattern with two streams rather than the three or four streams as described above.

The port 49 has an outwardly tapered mouth 35 having a seating surface 29 which co-operates with the seating surface 32 for the valve 33. Immediately inward of the mouth 35 is the cylindrical throat 36 which merges at 37 with the axial fuel supply passage 38. The poppet valve 33 has a conventional tapered head 39 to co-operate with the tapered mouth 35 and a cylindrical stem 40. Between the head 39 and the stem 40 there is a cylindrical boss 41 with a tapered portion 42 which merges with the stem 40.

The boss 41 and tapered portion 42 are scalloped out as indicated at 43 and 44 to provide areas of increased flow path between the boss 41 and the throat 36. The scalloped areas 43 and 44 are separated by a circumferentially narrow axial surface 45 and a circumferentially wide axial surface 46 of the boss.

When installed in the engine cylinder wall the nozzle is positioned so that the circumferentially wide axial surface 46 is uppermost towards the cylinder head 121 and the narrow axial surface 45 lowermost. As a result of the additional restrictions of fuel flow in the areas of the nozzle where the surfaces 45 and 46 are located, this nozzle will provide greater fuel flow into the cylinder in the downward direction through the scallops 43 and 44 than there is in the upward direction. Also as the scallops are outwardly oriented, the flow therethrough will be directed laterally to either side of the cylinder.

Other configurations of valves and seats may be used to achieve the required distribution of fuel issuing into the engine cylinder. Generally the configuration of the valve and seat is required to form respective streams of fuel droplets directed upwardly and downwardly with respect to the diametral plane of the cylinder at the nozzle with the apropriate proportions of the total amount of fuel in the respective streams.

A fuel metering and injection method and apparatus suitable for use in the practice of this invention is disclosed in each of pending Australian Patent Applications Nos. PH2876 and PH3343, and the disclosures in each of these applications is hereby incorporated in this specification by reference. The specifications of these particular applications disclose nozzles incorporating a valve and complementary seat wherein fuel is delivered to the passage, formed therebetween when the valve is in the open position, through a number of peripheral space orifices in the seat. Nozzles in accordance with these constructions may be used in practicing the present invention.

In this specification there has been specific reference to the direction and shape of the fuel droplet spray issuing into the engine from the injector nozzle. It will be appreciated that these features will be influenced by the conditions within the engine combustion chamber into which the fuel is injected, including the directions and velocities of the movement of the gas charge in the combustion chamber. These conditions and other dynamic influences preclude accurate defining of the fuel spray shape and direction under actual operating conditions. Accordingly the features of direction and shape of the fuel droplet spray referred to herein are described as determined in still air at atmospheric pressure and in the trajectories as shown in the drawings.

Reference has been made in the specification to varying the degree of penetration of the fuel spray into the combustion chamber with engine load and this may be achieved by varying the pressure of the fluid effecting injection. There is described in our Australian Patent Application No. PH1560 a method and apparatus for varying the pressure of a gas in which fuel is entrained, the fuel being injected into an engine combustion chamber by the pressure of the gas. That method and apparatus is suitable for use in conjunction with the method and apparatus of the present invention and by this reference to Australian Patent Application No. PH1560 the disclosure therein is hereby incorporated in this specification by reference.

This invention is applicable to two stroke cycle internal combustion engines for all uses and is particularly useful in contributing to fuel economy and the control of exhaust emissions in engines for or in vehicles including automobiles, motor cycles and boats and including outboard marine engines.

We claim:

1. A method of fuelling a two stroke cycle spark ignited engine having a cylinder in which a combustible charge is prepared, and a cylinder head closing one end of said cylinder, an ignition means mounted in said head to ignite the combustible charge, a piston supported to reciprocate in said cylinder, and an exhaust port in the wall of said cylinder spaced in the axial direction from said cylinder head, said method comprising injecting a metered quantity of fuel into the cylinder from a single injector located in the cylinder wall between the level of the exhaust port and the cylinder head, said fuel being injected in the form of at least two individual streams, said streams being arranged so a first part of the fuel is directed towards the ignition means in the cylinder head and a second part of the fuel is directed into that portion of the cylinder on the opposite side of a diametral plane of the cylinder at the location of injection of the fuel to the cylinder head.

2. A method of fuelling an engine as claimed in claim 1, wherein said fuel is injected in the form of three or more streams at least one of which is directed toward the ignition means in the cylinder head.

3. A method of fuelling an engine as claimed in claim 1 or 2, wherein the streams diverge from the injection location and are arranged to be located substantially within a cone diverging from the injection location and having an included angle between 90° and 150°.

4. A method of fuelling an engine as claimed in claim 1 or 2, wherein between 30 and 70 percent of the fuel injected per combustion cycle forms said first part of the fuel.

5. A method of fuelling an engine as claimed in claim 1, wherein the fuel is injected in the form of three streams, one directed into that part of the cylinder between the cylinder head and said diametral plane to form said first part of the fuel.

6. A method of fuelling an engine as claimed in claim 5, wherein between 30 and 70 percent of the fuel injected per combustion cycle forms said first part of the fuel.

7. A method of fuelling an engine as claimed in claim 1 or 2, wherein an air inlet port is provided in that side of the cylinder opposite the exhaust port and the location at which the fuel is injected to the cylinder is in that said side of the cylinder.

8. A method of fuelling a two stroke cycle spark ignited engine having a cylinder, a piston reciprocable in said cylinder, a cylinder head closing one end of said cylinder, a cavity in said cylinder head communicating with the cylinder and containing an ignition device, an exhaust port in the cylinder spaced from said cylinder head, and an air inlet port in the cylinder in the side of the cylinder opposite the exhaust port, the method comprising admitting air to the cylinder through said air inlet port, while the air is being admitted injecting fuel into the cylinder at a single location different from the air inlet port and in said side of the cylinder between said air inlet port and the cylinder head, said fuel being injected in the form of at least two individual streams, said streams being arranged so a first part of the fuel is directed towards the ignition means in the cylinder head and a second part of the fuel is directed into that portion of the cylinder on the opposite side of a diametral plane of the cylinder at the location of injection of the fuel to the cylinder head.

9. A method of fuelling an engine as claimed in claim 8, wherein the part of the fuel directed towards the cavity is 30 to 70 percent of the quantity of fuel injection per combustion cycle.

10. A method as claimed in claim 8 or 9, wherein the fuel is injected in the form of three or more streams, at least one of which is directed in said direction towards the cavity in the cylinder head.

11. A method as claimed in claim 10, wherein the fuel is injected in the form of at least three streams, two of said streams being directed into said part of the cylinder on said opposite side of the said diametral plane, each of said two streams divering in opposite directions from the axial plane of the cylinder passing through the location of injection.

12. A method as claimed in claim 11, wherein the streams of fuel form a spray pattern located substantially within a cone diverging from the injection location having an included angle between 90° and 150°.

13. In a two stroke cycle spark ignited engine having a cylinder in which a combustible charge is prepared, a cylinder head closing one end of said cylinder, an ignition means mounted in said head to ignite the combustible charge, a piston supported to reciprocate in said cylinder, and an exhaust port in the wall of the cylinder spaced in the axial direction from the cylinder head, the improvement comprising a single nozzle means through which fuel is injected to the cylinder and located in the cylinder wall between the level of the exhaust port and the cylinder head, said nozzle means for directing the fuel in the form of at least two individual streams, with a first part of the fuel directed towards the ignition means in the cylinder head and a second part of the fuel directed into that portion of the cylinder on the opposite side of a diametral plane of the cylinder at the location of injection of the fuel to the cylinder head.

14. The engine claimed in claim 13, wherein the nozzle means is adapted to inject the fuel in the form of three or more streams at least one of which is directed in said direction toward the ignition means in the cylinder head.

15. The engine as claimed in claim 13, wherein the nozzle means is adapted so the streams of fuel issue as diverging streams in a form located substantially within a cone diverging from the nozzle means and having an inclined angle between 90° and 150°.

16. The engine as claimed in claim 13, 14 or 15, wherein the nozzle means is adapted so that fuel issues therefrom to deliver between 30 and 70 percent of the fuel injected per combustion cycle into that part of the cylinder between the cylinder head and a diametral plane of the cylinder passing through the injection nozzle means.

17. An internal combustion engine as claimed in claim 13, 14 or 15, being an outboard marine engine.

* * * * *